(12) United States Patent
Lo et al.

(10) Patent No.: US 9,369,162 B2
(45) Date of Patent: Jun. 14, 2016

(54) COMMUNICATION APPARATUSES

(71) Applicant: Accton Technology Corporation, Hsinchu (TW)

(72) Inventors: Wen-Pin Lo, Taipei (TW); Hsin-Hsiung Kang, Taipei (TW); Sao-An Ho, Taipei (TW); Chi-Yu Lai, Dounan Township (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 14/610,655

(22) Filed: Jan. 30, 2015

(65) Prior Publication Data

US 2015/0295602 A1 Oct. 15, 2015

(30) Foreign Application Priority Data

Apr. 10, 2014 (TW) .............................. 103113183 A

(51) Int. Cl.
*H04B 1/10* (2006.01)
*H04B 1/04* (2006.01)
*H04B 1/18* (2006.01)
*H04B 1/525* (2015.01)
*H04W 84/12* (2009.01)

(52) U.S. Cl.
CPC ................ *H04B 1/10* (2013.01); *H04B 1/0475* (2013.01); *H04B 1/18* (2013.01); *H04B 1/525* (2013.01); *H04W 84/12* (2013.01)

(58) Field of Classification Search
CPC ...... H04B 1/0064; H04B 1/44; H04B 7/0602; H04B 7/0413; H04B 15/00; H04B 1/006; H04B 7/0845; H04B 1/0017; H04B 1/10; H01L 5/0062; H01L 5/1461; H01L 27/148; H01L 27/2334; H01L 27/2691; H01L 25/08; H01L 27/10; H01L 25/03834; H01L 25/03012
USPC .......................................... 375/350, 346, 285
See application file for complete search history.

(56) References Cited

U.S. PATENT DOCUMENTS

| 5,630,223 A | * | 5/1997 | Bahu ..................... H01Q 3/2611 455/24 |
| 6,961,596 B2 | * | 11/2005 | Van Erven ........... H01Q 1/2291 455/132 |
| 7,026,992 B1 | * | 4/2006 | Hunt ..................... G01S 5/0215 342/357.61 |

(Continued)

FOREIGN PATENT DOCUMENTS

| TW | 201145675 A1 | 12/2011 |
| TW | 201234792 A1 | 8/2012 |

*Primary Examiner* — Emmanuel Bayard
(74) *Attorney, Agent, or Firm* — Birch, Stewart, Kolasch & Birch, LLP

(57) ABSTRACT

A communication apparatus includes a first communication module, a second communication module, an antenna module and a filtering module. The first communication module transmits and receives a first RF signal on a first channel. The second communication module transmits and receives a second RF signal on a second channel. The antenna module includes multiple antennas for transmitting and receiving the first and second RF signals. The filtering module is coupled between the first and second communication modules and the antenna module. The filtering module filters the first RF signal according to a first frequency response, and it filters the second RF signal according to a second frequency response to ensure the first RF signal and the second RF signal do not interfere with each other.

9 Claims, 8 Drawing Sheets

(56) References Cited

U.S. PATENT DOCUMENTS

| | | | | |
|---|---|---|---|---|
| 7,573,805 | B2 | 8/2009 | Zhuang et al. | |
| 7,620,127 | B1 * | 11/2009 | Koenck | H04L 27/0008 375/219 |
| 7,680,510 | B2 * | 3/2010 | Crocker | H04B 1/18 333/109 |
| 7,761,107 | B2 * | 7/2010 | Pasternak | H04B 17/20 455/41.2 |
| 7,835,711 | B2 * | 11/2010 | McFarland | H04B 1/18 455/130 |
| 7,983,213 | B2 * | 7/2011 | Sato | H04L 45/00 370/329 |
| 8,072,896 | B2 * | 12/2011 | Wilhelmsson | H04W 16/14 370/252 |
| 8,102,785 | B2 * | 1/2012 | Rao | H01Q 3/267 370/278 |
| 8,325,632 | B2 * | 12/2012 | Gorbachov | H04B 1/48 343/835 |
| 8,355,715 | B2 * | 1/2013 | Rybicki | H04B 7/0837 375/256 |
| 8,706,061 | B2 * | 4/2014 | Klomsdorf | H04B 1/525 455/114.2 |
| 8,711,971 | B2 * | 4/2014 | Hung | H04B 7/0413 370/277 |
| 8,774,067 | B2 * | 7/2014 | Rousu | H01Q 1/242 333/126 |
| 8,797,895 | B2 * | 8/2014 | Baba | H04B 7/15542 370/252 |
| 8,797,927 | B2 * | 8/2014 | Chen | H04L 5/00 370/297 |
| 8,798,554 | B2 * | 8/2014 | Darnell | H01Q 1/243 333/132 |
| 8,805,397 | B2 * | 8/2014 | Sen | H04W 72/082 455/426.1 |
| 8,837,454 | B2 * | 9/2014 | Hegde | H04W 16/14 370/330 |
| 8,938,023 | B2 * | 1/2015 | Aparin | H04L 27/0002 370/334 |
| 9,118,394 | B2 * | 8/2015 | Black | H04B 1/401 |
| 9,124,355 | B2 * | 9/2015 | Black | H04B 1/525 |
| 9,154,239 | B2 * | 10/2015 | Dempsey | H04B 15/06 |
| 9,155,127 | B1 * | 10/2015 | de la Broise et al. | H04W 88/06 |
| 2004/0162037 | A1 | 8/2004 | Shpak | |
| 2005/0057426 | A1 * | 3/2005 | Itkin | H04B 1/3877 343/876 |
| 2007/0066345 | A1 * | 3/2007 | Hwang | H04B 1/0067 455/553.1 |
| 2010/0226291 | A1 * | 9/2010 | Gorbachov | H04B 1/48 370/280 |
| 2011/0092171 | A1 * | 4/2011 | Delforce | H04B 1/0064 455/90.2 |
| 2012/0009886 | A1 * | 1/2012 | Poulin | H04B 1/0064 455/78 |
| 2013/0176914 | A1 * | 7/2013 | Khlat | H04B 1/525 370/278 |
| 2013/0225095 | A1 * | 8/2013 | Hong | H04B 15/00 455/73 |
| 2014/0153671 | A1 * | 6/2014 | Klomsdorf | H04B 7/0404 375/299 |
| 2014/0227982 | A1 * | 8/2014 | Granger-Jones | H04B 7/0404 455/77 |
| 2014/0328220 | A1 * | 11/2014 | Khlat | H04L 5/1461 370/278 |
| 2014/0342678 | A1 * | 11/2014 | Khlat | H04L 5/001 455/78 |
| 2015/0065070 | A1 * | 3/2015 | Maxim | H03F 1/565 455/95 |
| 2015/0094008 | A1 * | 4/2015 | Maxim | H01F 5/003 455/245.1 |
| 2015/0139122 | A1 * | 5/2015 | Rimini | H04B 1/123 370/329 |
| 2015/0139160 | A1 * | 5/2015 | Fischer | H04K 3/822 370/329 |
| 2015/0229461 | A1 * | 8/2015 | DiFazio | H04L 5/14 370/280 |

\* cited by examiner

COMMUNICATION APPARATUSES

CROSS REFERENCE TO RELATED APPLICATIONS

This application claims priority of Taiwan Patent Application No. 103113183, filed on Apr. 10, 2014, the entirety of which is incorporated by reference herein.

BACKGROUND OF THE INVENTION

1. Field of the Invention

The invention relates to wireless communication apparatuses, and more particularly to wireless communication apparatuses capable of supporting wireless communication on different WiFi 2.4 GHz channels at the same time.

2. Description of the Related Art

With the advancement of wireless transmission technologies and especially the appearance of on-chip systems based on the 2.4 GHz frequency band and having characteristics of low power consumption, low radiation, low cost, and so on, it becomes possible for wireless transmission technologies to be widely used in wireless digital products. The wireless transmission technologies using the 2.4 GHz frequency band include the WiFi, WiMAX and Bluetooth.

One of the related products based on the WiFi includes an access point (AP). An AP normally connects directly to a wired Ethernet connection and the AP then provides wireless connections using radio frequency links for other devices to utilize that wired connection. Most APs support the connection of multiple wireless devices to one wired connection. Modern APs work in compliance with a standard, such as the IEEE 802.11 standard.

The IEEE 802.11 technology uses four distinct frequency ranges: 2.4 GHz, 3.6 GHz, 4.9 GHz, 5 GHz, and 5.9 GHz bands. Each range is divided into a multitude of channels. There are 14 channels designated in the 2.4 GHz range spaced 5 MHz apart (with the exception of a 12 MHz spacing between Channel 13 and Channel 14).

Because the spacing is only 5 MHz, it is hard for a modern WiFi AP to support wireless communication on different channels at the same time due to the interference coming from other channels. To overcome this problem, novel wireless communication apparatuses capable of supporting wireless communication on different 2.4 GHz WiFi channels at the same time are provided.

BRIEF SUMMARY OF THE INVENTION

Communication apparatuses are provided. An exemplary embodiment of a communication apparatus comprises a first communication module, a second communication module, an antenna module and a filtering module. The first communication module transmits and receives a first RF signal on a first channel. The second communication module transmits and receives a second RF signal on a second channel. The antenna module comprises multiple antennas for transmitting and receiving the first and second RF signals. The filtering module is coupled between the first and second communication modules and the antenna module, filters the first RF signal according to a first frequency response and filters the second RF signal according to a second frequency response to ensure the first RF signal and the second RF signal do not interfere with each other.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
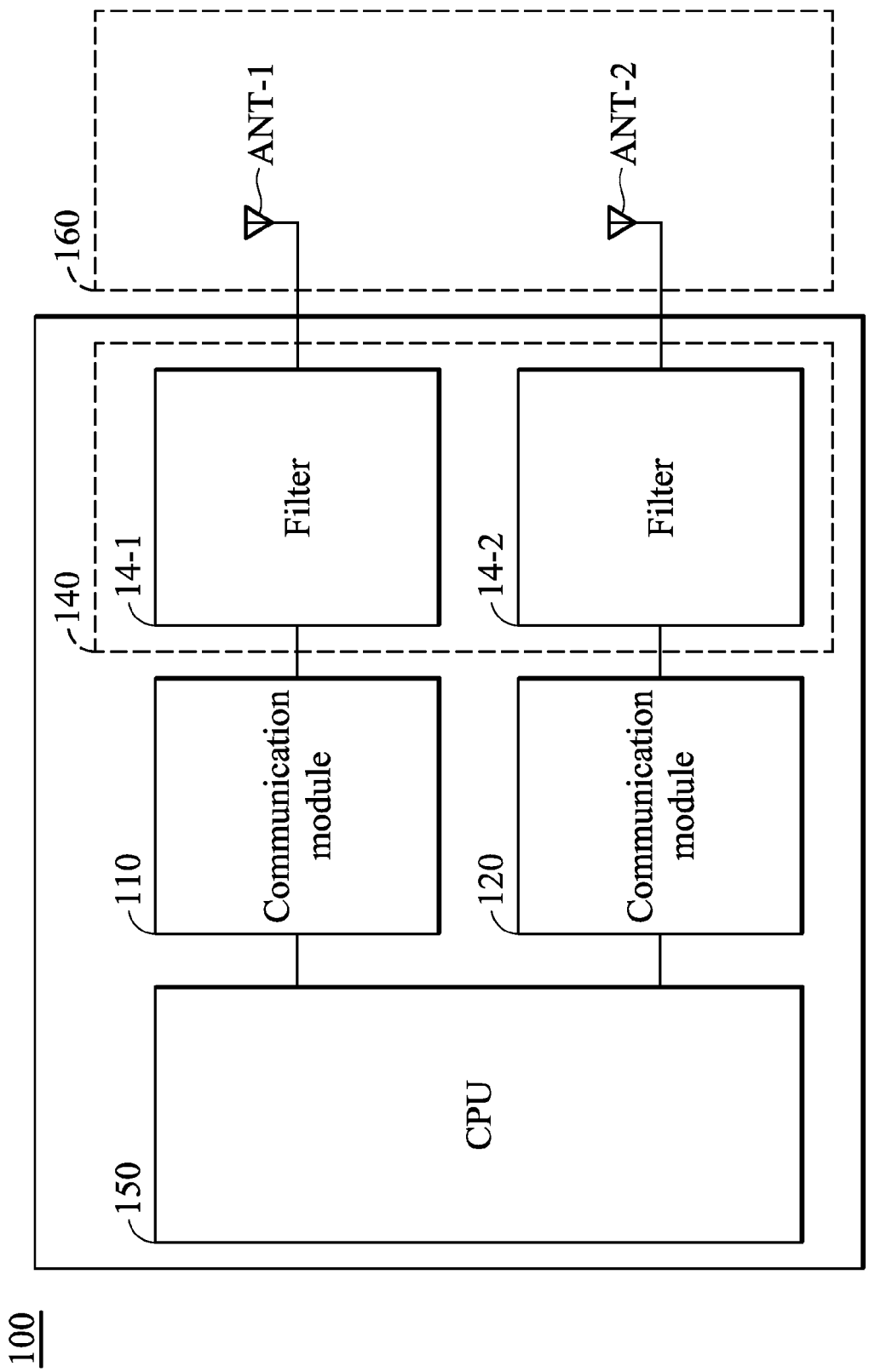
FIG. 1 shows a block diagram of a communication apparatus according to an embodiment of the invention.

FIG. 1 shows a block diagram of a communication apparatus according to an embodiment of the invention. The communication apparatus 100 may be a WiFi base station, also called an access point (AP), and may comprise communication modules 110 and 120, a filter module 140, a central processing unit (CPU) 150 and an antenna module 160. The communication module 110 provides communication services on a first channel and the communication module 120 provides communication services on a second channel. According to an embodiment of the invention, the communication modules 110 and 120 may be the WiFi communication modules, and the first channel and the second channel may be different channels in a 2.4 GHz frequency band utilized by WiFi communication technology or may be different channels in a 5 GHz frequency band utilized by WiFi communication technology. For example, the WiFi communication technology utilizes 14 channels in the 2.4 GHz frequency band, and the first channel and the second channel may be different channels among the 14 channels.

The communication modules 110 and 120 may comprise a plurality of hardware devices and software and firmware modules for performing RF signal conversion and processing, baseband signal conversion and processing and digital signal conversion and processing. The CPU 150 is coupled to the communication modules 110 and 120 for controlling the operations thereof. The antenna module 160 may comprise a plurality of antennas for transmitting the RF signals generated by the communication modules 110 and 120 and receiving the RF signals for the corresponding communication modules 110 and 120. The antenna module 160 may also be implemented as Multiple-Input Multiple-Output (MIMO) antenna module for transmitting and receiving a plurality of RF signal streams (which will be discussed in further detail in the following paragraphs).

According to an embodiment of the invention, in order to ensure the RF signal transmission and reception of the communication modules 110 and 120 do not interfere with each other, the communication apparatus 100 may further comprise the filter module 140 coupled between the communication modules 110 and 120 and the antenna module 160 for filtering the RF signals corresponding to the communication modules 110 and 120. Note that in the embodiments of the invention, the filter module 140 may be designed to filter only the RF signals transmitted by the communication modules 110 and 120, or may be designed to filter only the RF signals received by the communication modules 110 and 120, or may be designed to filter both the RF signals transmitted by the communication modules 110 and 120 and received by the communication modules 110 and 120. Therefore, the invention should not be limited to any specific method of implementation. In addition, in order to clarify the concept of the invention, FIG. 1 presents a simplified block diagram, in which only the elements relevant to the invention are shown. However, it should be noted that the invention should not be limited what is shown in FIG. 1.

In the embodiment shown in FIG. 1, the antenna module 160 may comprise at least two antennas ANT-1 and ANT-2. The antenna ANT-1 transmits and receives the RF signals of the communication module 110. The antenna ANT-2 transmits and receives the RF signals of the communication module 120. According to an embodiment of the invention, the filter module 140 may comprise filters 14-1 and 14-2. The filter 14-1 is coupled between the antenna ANT-1 and the communication module 110 for filtering the RF signals of the communication module 110 according to a first frequency response. The filter 14-2 is coupled between the antenna ANT-2 and the communication module 120 for filtering the RF signals of the communication module 120 according to a second frequency response. The first frequency response may be designed according to the communication spectrum of the first channel and the second frequency response may be designed according to the communication spectrum of the second channel.

Figure 2A:
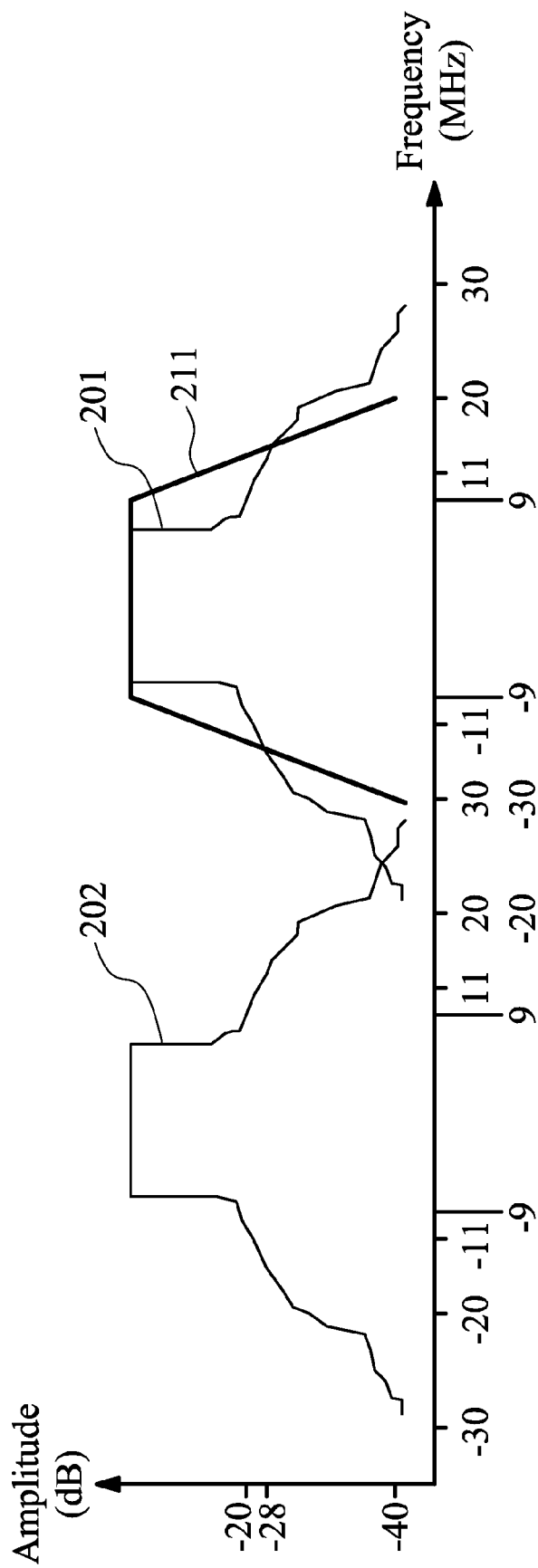
FIG. 2A and FIG. 2B respectively show the exemplary spectrums according to an embodiment of the invention.
Figure 2B:
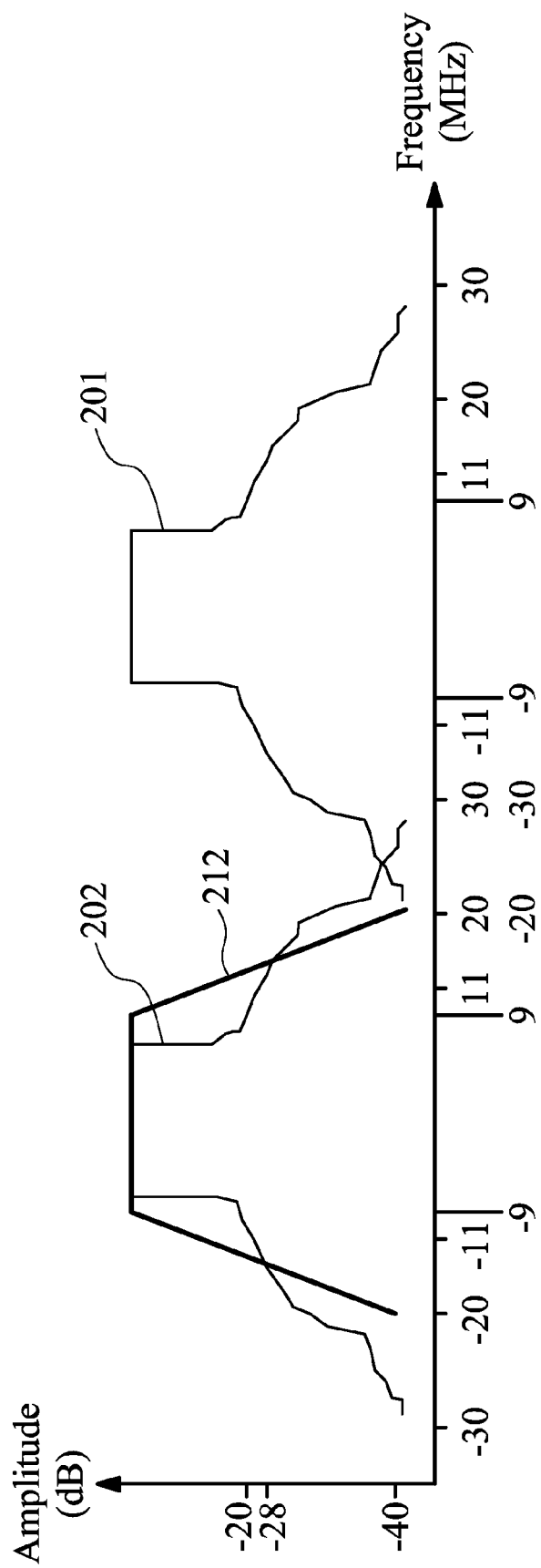

FIG. 2A and FIG. 2B respectively show the exemplary spectrums according to an embodiment of the invention. The curve 201 shows the communication spectrum of the first channel, and the curve 202 shows the communication spectrum of the second channel. The curve 211 shows the first frequency response and the curve 212 shows the second frequency response. As shown in FIG. 2A, via the filter 14-1, the interfering signals coming from the second channel as the curve 202 and falling in the first channel can be filtered. Similarly, as shown in FIG. 2B, via the filter 14-2, the interfering signal coming from the first channel as the curve 201 and falling in the second channel can be filtered. In this manner, even when the communication modules 110 and 120 perform RF signal transmission and/or reception at the same time, the transmission and/or reception thereof will not interfere with each other. Note that the spectrums shown in FIG. 2A and FIG. 2B are merely the exemplary spectrums for illustrating the concept of the invention, and the invention should not be limited thereto.

Figure 3:
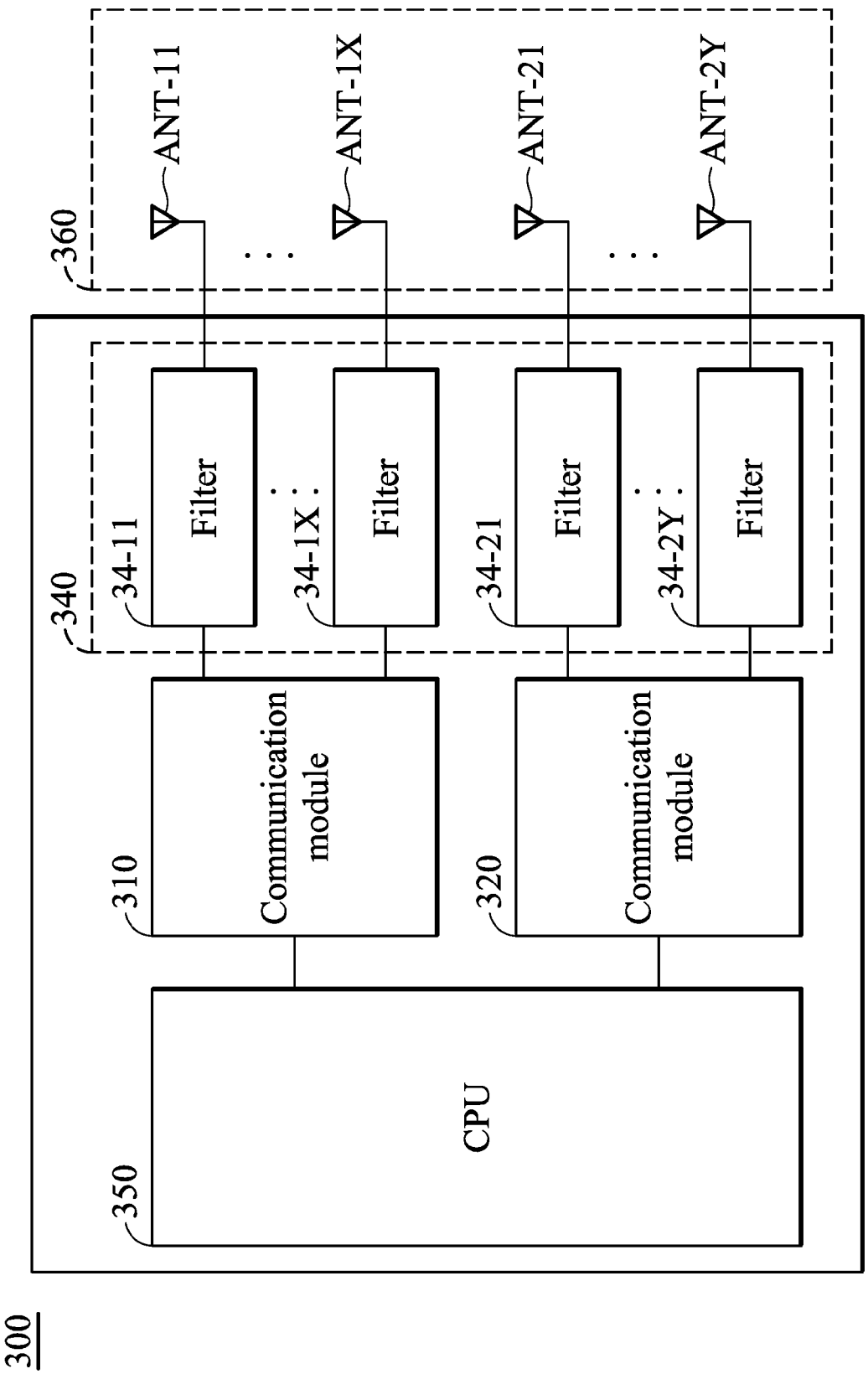
FIG. 3 shows a block diagram of a communication apparatus according to another embodiment of the invention.

FIG. 3 shows a block diagram of a communication apparatus according to another embodiment of the invention. The communication apparatus 300 may comprise communication modules 310 and 320, filter module 340, CPU 350 and antenna module 360. For descriptions of the communication modules 310 and 320 and the CPU 350, reference may be made to the descriptions of the communication modules 110 and 120 and the CPU 150, which are not repeated here.

In this embodiment, the communication modules 310 and 320 may both support MIMO communications. Therefore, the communication module 310 may transmit and receive a plurality of RF signal streams on the first channel, the communication module 320 may transmit and receive a plurality of RF signal streams on the second channel, and here, an RF signal stream may be an RF signal. Suppose that the communication module 310 may support A*B MIMO communications; the communication module 320 may support C*D MIMO communications, wherein the A, B, C and D are positive integers greater than or equal to 1. The antenna module 360 may be the MIMO antenna module and may comprise the antennas ANT-11~ANT-1X and ANT-21~ANT-2Y. Each antenna may be configured to transmit and receive an RF signal stream, where X may be the maximum value of A and B and Y may be the maximum value of C and D. That is, X=max(A,B) and Y=max(C,D).

According to an embodiment of the invention, the filter module 340 may comprise filters 34-11~34-1X and 34-21~34-2Y. Each filter is coupled to an antenna for filtering an RF signal stream. For example, the filter 34-11 is coupled between the antenna ANT-11 and the communication module 310 for filtering an RF signal stream of the communication module 310 according to the first frequency response. The filter 34-21 is coupled between the antenna ANT-21 and the communication module 320 for filtering an RF signal stream of the communication module 320 according to the second frequency response. The filter 34-1X is coupled between the antenna ANT-1X and the communication module 310 for filtering another RF signal stream of the communication module 310 according to the first frequency response. The filter 34-2Y is coupled between the antenna ANT-2Y and the communication module 320 for filtering another RF signal stream of the communication module 320 according to the second frequency response. The first frequency response may be designed according to the communication spectrum of the first channel and the second frequency response may be designed according to the communication spectrum of the second channel, such that the RF signal streams transmitted and received by the communication modules 310 and 320 will not interfere with each other.

According to an embodiment of the invention, the filter module may also be implemented by a plurality of duplexers, triplexers, multiplexers, or any elements having the functionality of the duplexer/triplexer, and/or the functionalities of filtering and multiplexing, . . . etc. The duplexers, triplexers . . . etc. as discussed above may be provided with the functionalities of a filter, a combiner and a divider at the same time.

Figure 4:
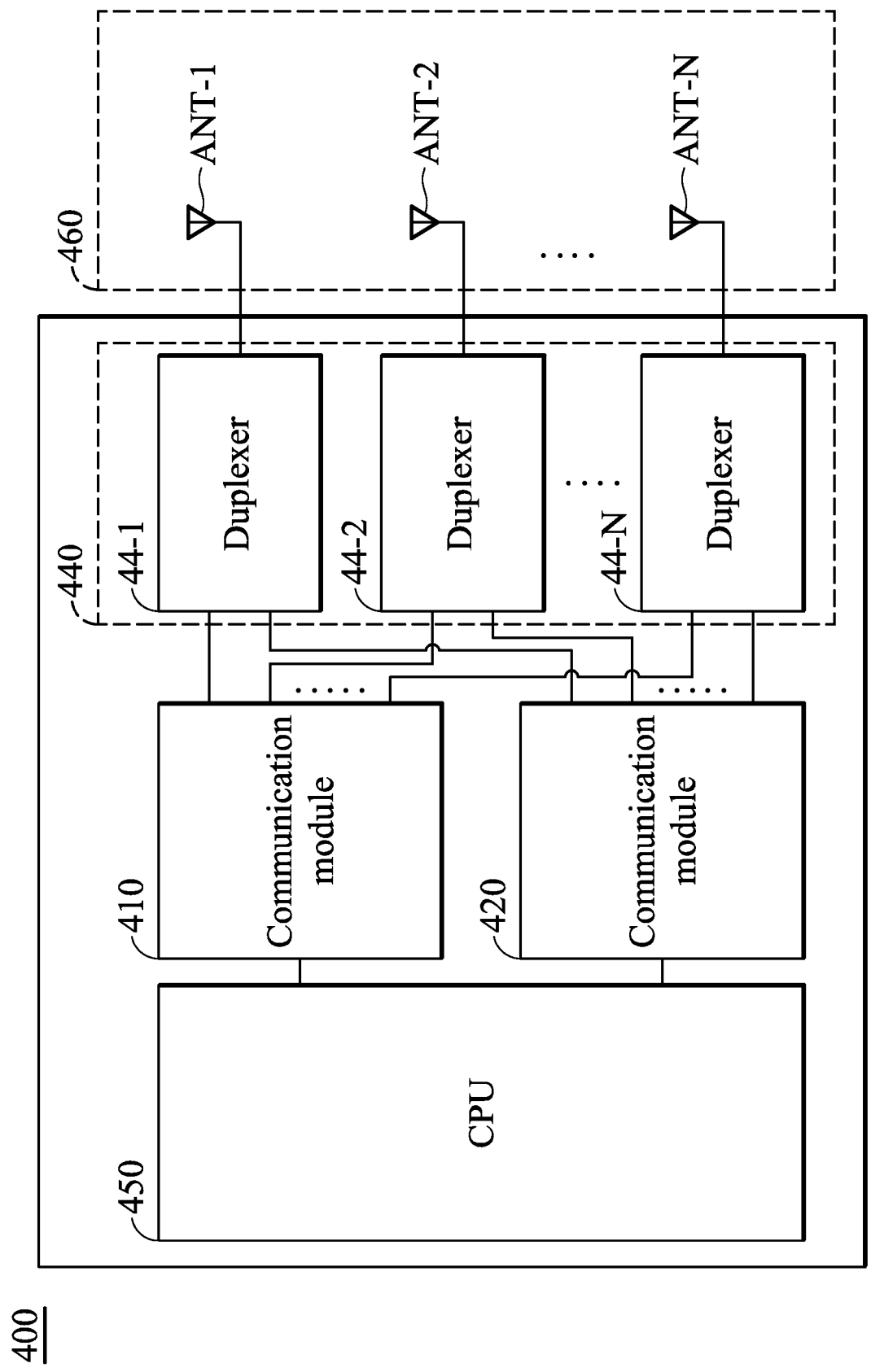
FIG. 4 shows a block diagram of a communication apparatus according to yet another embodiment of the invention.

FIG. 4 shows a block diagram of a communication apparatus according to yet another embodiment of the invention. The communication apparatus 400 may comprise communication modules 410 and 420, filter module 440, CPU 450 and antenna module 460. For descriptions of the communication modules 410 and 420 and the CPU 450, reference may be made to the descriptions of the communication modules 110 and 120 and the CPU 150, which are not repeated here.

In this embodiment, suppose that the communication module 410 may support A*B MIMO communications, the communication module 420 may support C*D MIMO communications. Therefore, the communication module 410 may transmit and receive a plurality of RF signal streams on the first channel, the communication module 420 may transmit and receive a plurality of RF signal streams on the second channel, wherein the A, B, C and D are positive integers greater than or equal to 1. The antenna module 460 may be the MIMO antenna module and may comprise the antennas ANT-1~ANT-N. Each antenna may be configured to transmit and receive an RF signal stream of the communication modules 410 and 420, where N may be the maximum value of A, B, C and D. That is, N=max(A,B,C,D).

According to an embodiment of the invention, the filter module 440 may comprise duplexers 44-1, 44-2, . . . 44-N.

Each duplexer may be coupled to an antenna for filtering the received RF signal stream. For example, the duplexer 44-1 is coupled between the antenna ANT-1 and the communication modules 410 and 420 and filters an RF signal stream of the communication module 410 according to the first frequency response and filters an RF signal stream of the communication module 420 according to the second frequency response. The duplexer 44-2 is coupled between the antenna ANT-2 and the communication modules 410 and 420 and filters an RF signal stream of the communication module 410 according to the first frequency response and filters an RF signal stream of the communication module 420 according to the second frequency response. The duplexer 44-N is coupled between the antenna ANT-N and the communication modules 410 and 420 and filters an RF signal stream of the communication module 410 according to the first frequency response and filters an RF signal stream of the communication module 420 according to the second frequency response. The first frequency response may be designed according to the communication spectrum of the first channel and the second frequency response may be designed according to the communication spectrum of the second channel, such that the RF signal streams transmitted and received by the communication modules 410 and 420 will not interfere with each other.

Note that comparing to the communication apparatus 300 as shown in FIG. 3, by using the duplexers, each antenna may be shared by the communication modules 410 and 420. Therefore, in the scenario that the same number of RF signal streams is supported by the communication modules, the number of required antenna can be reduced in the communication apparatus 400 as shown in FIG. 4.

Figure 5:
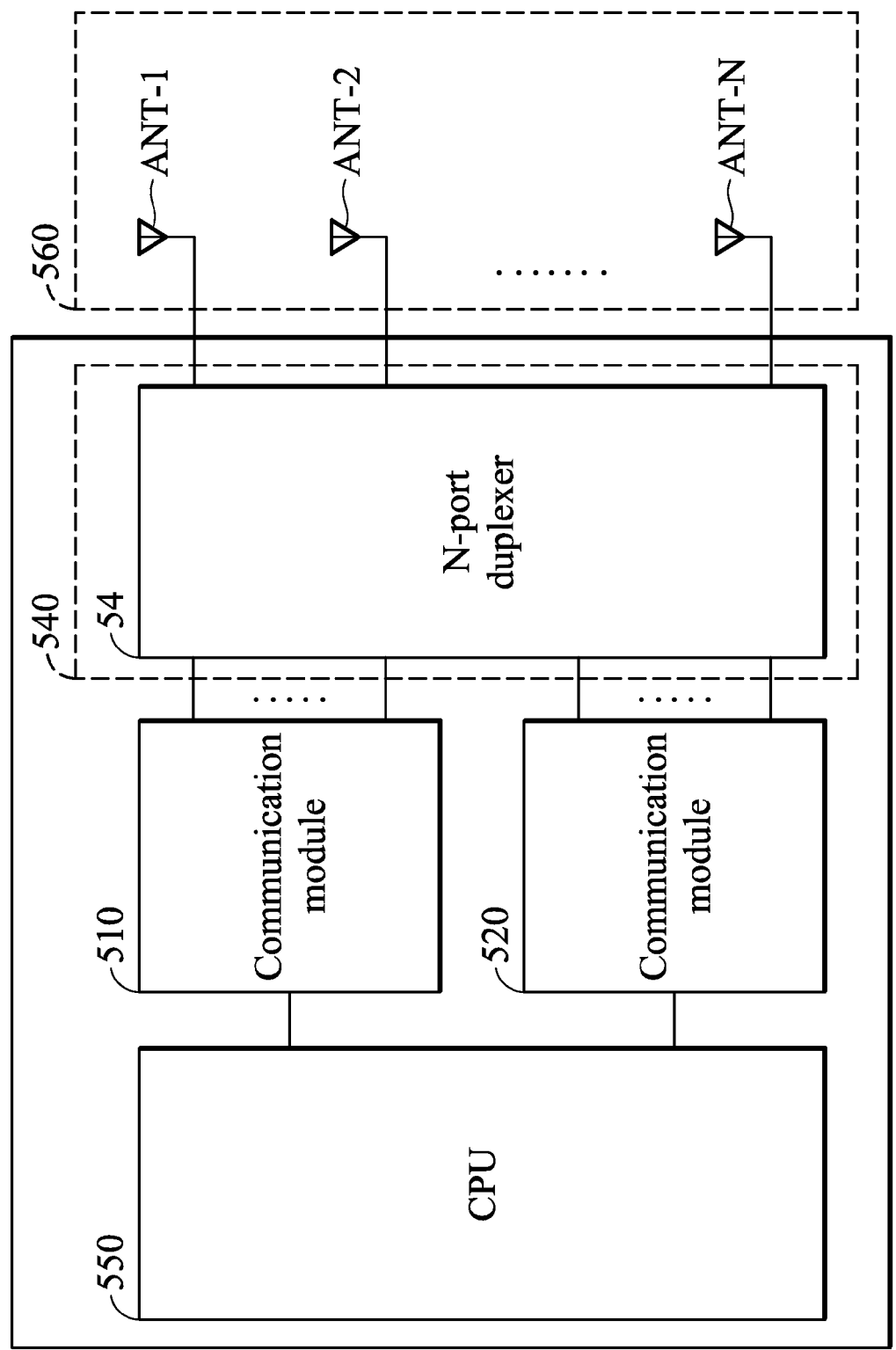
FIG. 5 shows a block diagram of a communication apparatus according to yet another embodiment of the invention.

FIG. 5 shows a block diagram of a communication apparatus according to yet another embodiment of the invention. The communication apparatus 500 may comprise communication modules 510 and 520, filter module 540, CPU 550 and antenna module 560. For descriptions of the communication modules 510 and 520 and the CPU 550, reference may be made to the descriptions of the communication modules 110 and 120 and the CPU 150, which are not repeated here.

In this embodiment, suppose that the communication module 510 may support A*B MIMO communications; the communication module 520 may support C*D MIMO communications. Therefore, the communication module 510 may transmit and receive a plurality of RF signal streams on the first channel, and the communication module 520 may transmit and receive a plurality of RF signal streams on the second channel, wherein the A, B, C and D are positive integers greater than or equal to 1. The antenna module 560 may be the MIMO antenna module and may comprise the antennas ANT-1~ANT-N. Each antenna may be configured to transmit and receive an RF signal stream of the communication modules 510 and 520, where N may be the maximum value of A, B, C and D. That is, N=max(A,B,C,D).

According to an embodiment of the invention, the filter module 540 may comprise an N-port duplexer 54 coupled to the antennas ANT-1~ANT-N for receiving the RF signal streams of the communication modules 510 and 520, and filtering the RF signal streams of the communication module 510 according to the first frequency response and filtering the RF signal streams of the communication module 520 according to the second frequency response. The first frequency response may be designed according to the communication spectrum of the first channel and the second frequency response may be designed according to the communication spectrum of the second channel, such that the RF signal streams transmitted and received by the communication modules 510 and 520 will not interfere with each other.

In some embodiments of the invention, the communication apparatus may further comprise more than two communication modules.

Figure 6:
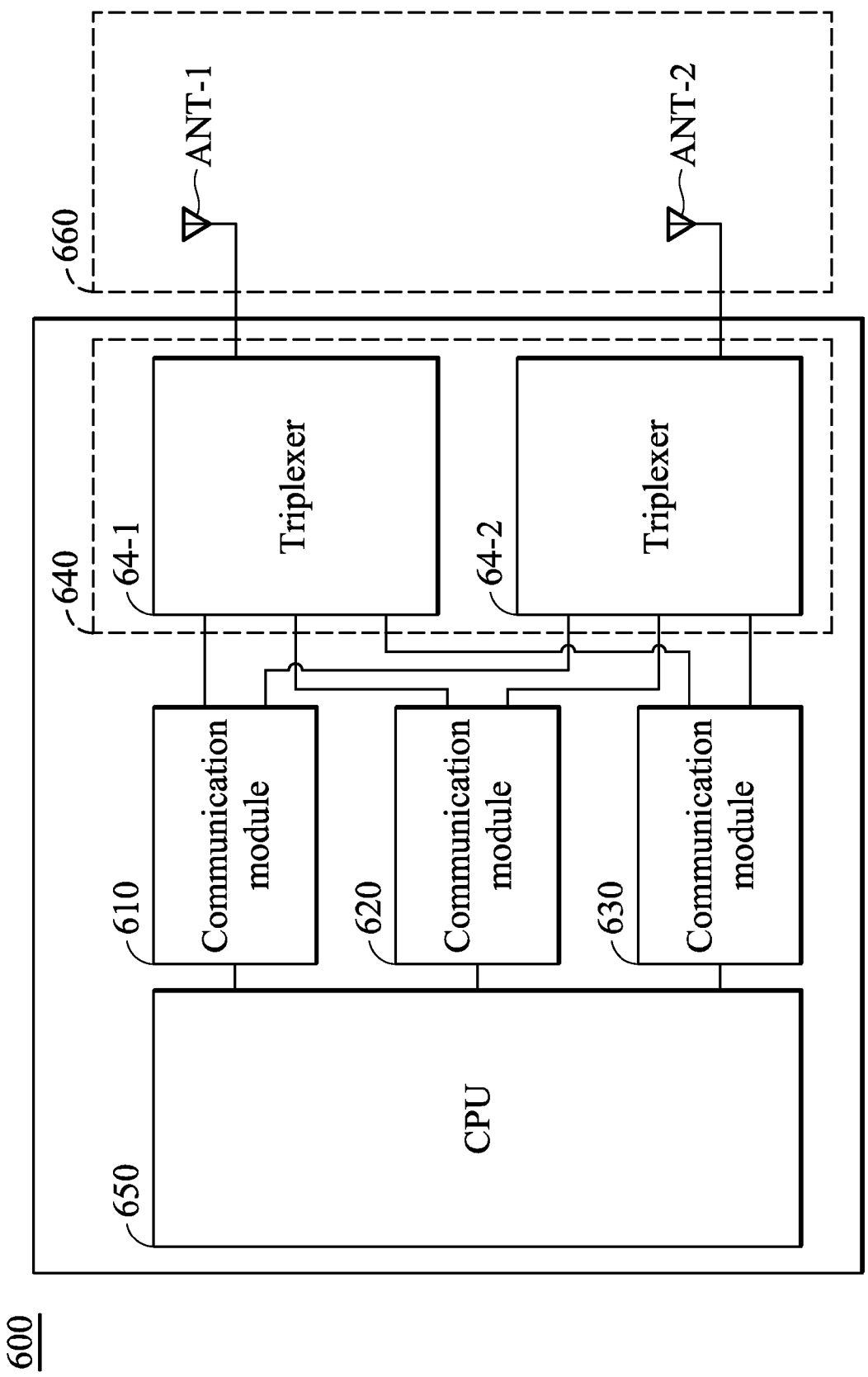
FIG. 6 shows a block diagram of a communication apparatus according to yet another embodiment of the invention.

FIG. 6 shows a block diagram of a communication apparatus according to yet another embodiment of the invention. The communication apparatus 600 may comprise communication modules 610, 620 and 630, a filter module 640, a CPU 650 and an antenna module 660. The communication module 610 provides communication services on a first channel, the communication module 620 provides communication services on a second channel and the communication module 630 provides communication services on a third channel. According to an embodiment of the invention the first channel, the second channel and the third channel may be different channels in a 2.4 GHz frequency band utilized by WiFi communication technology or may be different channels in a 5 GHz frequency band utilized by WiFi communication technology.

The communication modules 610, 620 and 630 may comprise a plurality of hardware devices and software and firmware modules for performing RF signal conversion and processing, baseband signal conversion and processing and digital signal conversion and processing. The CPU 650 is coupled to the communication modules 610, 620 and 630 for controlling the operations thereof. The antenna module 660 may comprise a plurality of antennas for transmitting the RF signals generated by the communication modules 610, 620 and 630 and receiving the RF signals for the corresponding communication modules 610, 620 and 630. The antenna module 660 may also be implemented as MIMO antenna module for transmitting and receiving a plurality of RF signal streams.

In the embodiment shown in FIG. 6, suppose that the antenna module 660 may comprise antennas ANT-1 and ANT-2, and the communication modules 610, 620 and 630 may support 2*2 MIMO communications. Therefore, the communication module 610 may transmit and receive two RF signal streams on the first channel, the communication module 620 may transmit and receive two RF signal streams on the second channel, and communication module 630 may transmit and receive two RF signal streams on the third channel.

The filter module 640 may comprise triplexers 64-1 and 64-2. Each triplexer is coupled to an antenna for filtering the received RF signal (or, the RF signal streams). For example, the triplexer 64-1 is coupled to the antenna ANT-1 and filters an RF signal stream of the communication module 610 according to the first frequency response, filters an RF signal stream of the communication module 620 according to the second frequency response and filters an RF signal stream of the communication module 630 according to the third frequency response. The triplexer 64-2 is coupled to the antenna ANT-2 and filters another RF signal stream of the communication module 610 according to the first frequency response, filters another RF signal stream of the communication module 620 according to the second frequency response and filters another RF signal stream of the communication module 630 according to the third frequency response. The first frequency response may be designed according to the communication spectrum of the first channel, the second frequency response may be designed according to the communication spectrum of the second channel and the third frequency response may be designed according to the communication spectrum of the third channel, such that the RF signal streams transmitted and received by the communication modules 610, 620 and 630 will not interfere with each other.

Note that the filter module 640 may also be implemented by a plurality of filters as shown in FIG. 1 or FIG. 3, or may be implemented by combining a plurality of triplexers as an N-port triplexer as shown in FIG. 5 to support MIMO communications. Therefore, the invention should not be limited to the structure shown in FIG. 6.

Figure 7:
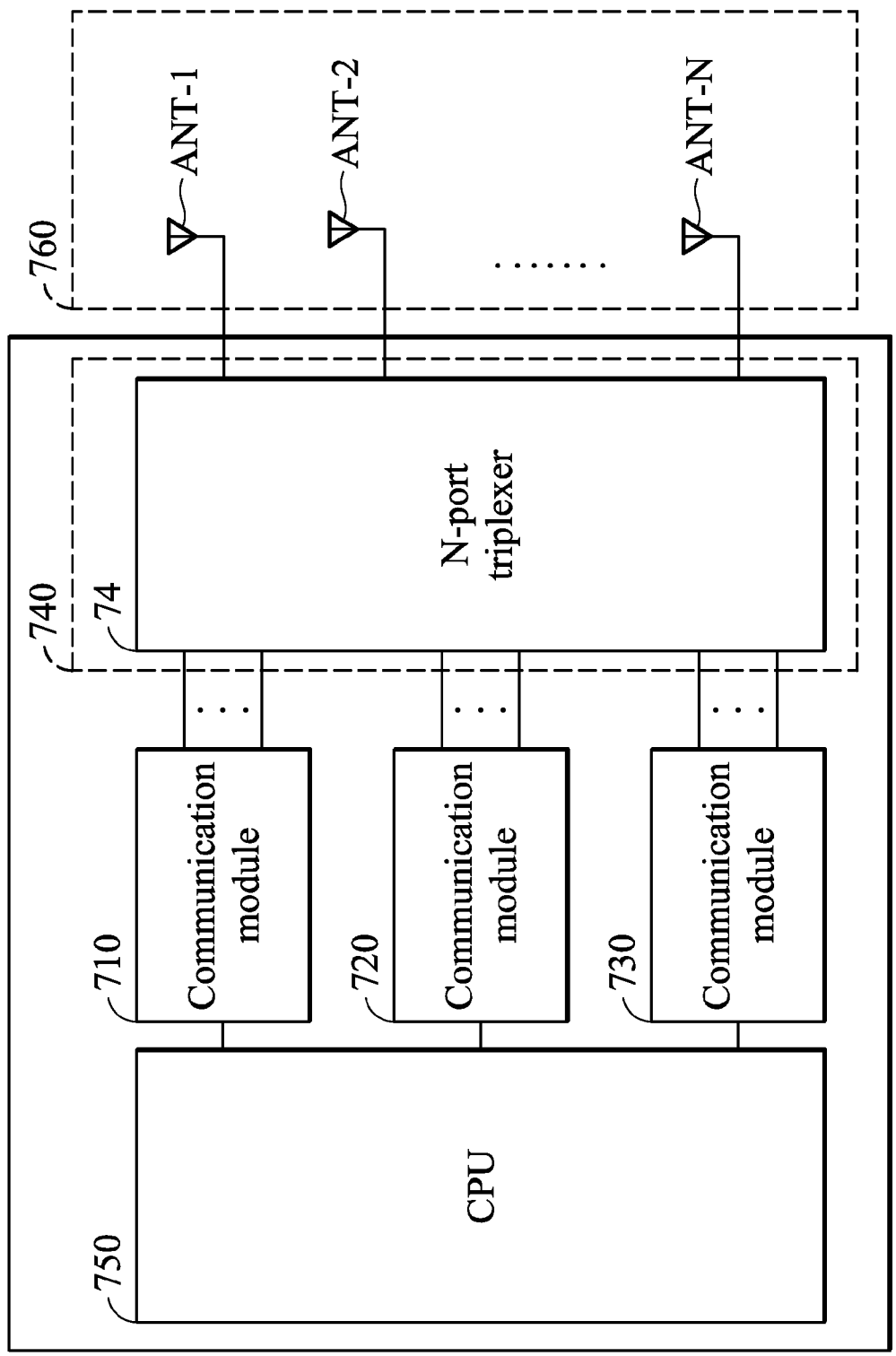
FIG. 7 shows a block diagram of a communication apparatus according to yet another embodiment of the invention.

FIG. 7 shows a block diagram of a communication apparatus according to yet another embodiment of the invention. The communication apparatus 700 may comprise communication modules 710, 720 and 730, a filter module 740, a CPU 750 and an antenna module 760. For descriptions of the communication modules 710, 720 and 730 and the CPU 750, reference may be made to the descriptions of the communication modules 610, 620 and 630 and the CPU 650, which are not repeated here.

In the embodiment, suppose that the communication module 710 may support A*B MIMO communications, the communication module 720 may support C*D MIMO communications and the communication module 730 may support E*F MIMO communications 1, wherein the A, B, C, D, E and F are positive integers greater than or equal to 1. Therefore, the communication module 710 may transmit and receive a plurality of RF signal streams on the first channel, the communication module 720 may transmit and receive a plurality of RF signal streams on the second channel and the communication module 730 may transmit and receive a plurality of RF signal streams on the third channel. The antenna module 760 may be the MIMO antenna module and may comprise the antennas ANT-1~ANT-N. Each antenna may be configured to transmit and receive an RF signal stream of the communication modules 710, 720 and 730, where N may be the maximum value of A, B, C, D, E and F. That is, N=max(A,B,C,D,E,F).

According to an embodiment of the invention, the filter module 740 may comprise an N-port triplexer 74 coupled to the antennas ANT-1~ANT-N for receiving the RF signal streams of the communication modules 710, 720 and 730, and filtering the RF signal streams of the communication module 710 according to the first frequency response, filtering the RF signal streams of the communication module 720 according to the second frequency response and filtering the RF signal streams of the communication module 730 according to the third frequency response. The first frequency response may be designed according to the communication spectrum of the first channel, the second frequency response may be designed according to the communication spectrum of the second channel, and the third frequency response may be designed according to the communication spectrum of the third channel, such that the RF signal streams transmitted and received by the communication modules 710, 720 and 730 will not interfere with each other.

According to an embodiment of the invention, considering the complexity of designing the frequency responses of the filters, the multiplexers or the triplexers, the central frequency of the channel supported by each communication module should be adequately arranged to achieve the optimum filtering results. For example, in an embodiment of the invention, suppose that the first channel have a bandwidth FBW1 and the second channel have a bandwidth FBW2, a space between the central frequencies of the two channels is preferably greater than at least an average of the bandwidths of the two channels (that is, FBW1+FBW2)/2). For example, take the 20 MHz channel bandwidth as an example; a space between the central frequency of each adjacent but not overlapped channel is preferably greater than 20 MHz. Note that the concept of the invention may also be applied in other communication system having a channel bandwidth different from 20 MHz, and may also be applied in the communication system comprising a plurality of channels with the adjacent channels having different channel bandwidths. Therefore, the invention should not be limited thereto.

In addition, in other embodiments of the invention, the communication apparatus may also comprise more than three communication modules. Take the structure shown in FIG. 7 as an example, suppose that the communication apparatus comprises M communication modules, where M is a positive integer greater than or equal to 3, the filter module 740 may comprise an M*N port multiplexer for performing the functionalities of filtering, combining and dividing as discussed above.

In the embodiment of the invention, by using the filter module, each communication module may respectively transmit and receive the corresponding RF signals without interfering with each other. In this manner, the communication apparatus capable of concurrently supporting wireless communication on different channels can be achieved. In addition, since the RF signals corresponding to each communication module will not interfere with each other, the distance between the antennas equipped in the communication apparatus can be reduced and therefore the circuit area of the communication apparatus can be reduced.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus, comprising: a first communication module, transmitting and receiving a first radio frequency (RF) signal on a first channel; a second communication module, transmitting and receiving a second RF signal on a second channel; an antenna module, comprising a plurality of antennas for transmitting and receiving the first and the second RF signals; and a filter module, coupled to the first communication module, the second communication module and the antenna module, filtering the first RF signal according to a first frequency response and filtering the second RF signal according to a second frequency response to ensure the first RF signal and the second RF signal do not interfere with each other, wherein the first channel has a first bandwidth, the second channel has a second bandwidth, and wherein a space between a central frequency of the first channel and a central frequency of the second channel is greater than an average of the first bandwidth and the second bandwidth.

2. The communication apparatus as claimed in claim 1, wherein the first communication module and the second communication module are WiFi communication modules, and wherein the first channel and the second channel are different channels in a 2.4 GHz frequency band or a 5 GHz frequency band.

3. The communication apparatus as claimed in claim 1, wherein the antenna module comprises a first antenna and a second antenna, and the filter module comprises:
a first filter, coupled to the first antenna, filtering the first RF signal according to the first frequency response; and
a second filter, coupled to the second antenna, filtering the second RF signal according to the second frequency response.

4. The communication apparatus as claimed in claim 1, wherein the first communication module further transmits and receives a third RF signal on the first channel and the second communication module further transmits and receives a fourth RF signal on the second channel, and the antenna module comprises a first antenna, a second antenna, a third antenna and a fourth antenna, wherein the first antenna transmits and receives the first RF signal, the second antenna transmits and receives the second RF signal, the third antenna transmits and receives the third RF signal and the fourth antenna transmits and receives the fourth RF signal, and the filter module comprises:

a first filter, coupled to the first antenna, filtering the first RF signal according to the first frequency response;

a second filter, coupled to the second antenna, filtering the second RF signal according to the second frequency response;

a third filter, coupled to the third antenna, filtering the third RF signal according to the first frequency response; and a fourth filter, coupled to the fourth antenna, filtering the fourth RF signal according to the second frequency response.

5. The communication apparatus as claimed in claim 1, wherein the first communication module further transmits and receives a third RF signal on the first channel and the second communication module further transmits and receives a fourth RF signal on the second channel, and the antenna module comprises a first antenna and a second antenna, wherein the first antenna transmits and receives the first RF signal and the second RF signal, the second antenna transmits and receives the third RF signal and the fourth RF signal, and the filter module comprises:

a first duplexer, coupled to the first antenna, receiving the first RF signal and the second RF signal and filtering the first RF signal according to the first frequency response and filtering the second RF signal according to the second frequency response; and a second duplexer, coupled to the second antenna, receiving the third RF signal and the fourth RF signal and filtering the third RF signal according to the first frequency response and filtering the fourth RF signal according to the second frequency response.

6. The communication apparatus as claimed in claim 1, wherein the first communication module supports A*B multiple-input multiple-output (MIMO) communications to transmit and receive a plurality of first RF signal streams on the first channel, the second communication module supports C*D MIMO communications to transmit and receive a plurality of second RF signal streams on the second channel, wherein A, B, C and D are positive integers greater than or equal to 1, and the filter module comprises:

an N-port duplexer, coupled to the antennas, receiving the first RF signal streams and the second RF signal streams, filtering the first RF signal streams according to the first frequency response and filtering the second RF signal streams according to the second frequency response, wherein N equals to the maximum value among the A, B, C and D.

7. The communication apparatus as claimed in claim 1, further comprises:

a third communication module, transmitting and receiving a third RF signal on a third channel, wherein the antennas are further used for transmitting and receiving the third RF signal, and the filter module is further coupled to the third communication module and filters the third RF signal according to a third frequency response to ensure the first RF signal, the second RF signal and the third RF signal do not interfere with each other.

8. The communication apparatus as claimed in claim 7, wherein the first communication module further transmits and receives a fourth RF signal on the first channel, the second communication module further transmits and receives a fifth RF signal on the second channel, and the third communication module further transmits and receives a sixth RF signal on the third channel, the antenna module comprises a first antenna and a second antenna, the first antenna transmits and receives the first RF signal, the second RF signal and the third RF signal, the second antenna transmits and receives the fourth RF signal, the fifth RF signal and the sixth RF signal, and wherein the filter module comprises:

a first triplexer, coupled to the first antenna, receiving the first RF signal, the second RF signal and the third RF signal and filtering the first RF signal according to the first frequency response, filtering the second RF signal according to the second frequency response and filtering the third RF signal according to the third frequency response; and a second triplexer, coupled to the second antenna, receiving the fourth RF signal, the fifth RF signal and the sixth RF signal and filtering the fourth RF signal according to the first frequency response, filtering the fifth RF signal according to the second frequency response and filtering the sixth RF signal according to the third frequency response.

9. The communication apparatus as claimed in claim 7, wherein the first communication module supports A*B multiple-input multiple-output (MIMO) communications to transmit and receive a plurality of first RF signal streams on the first channel, the second communication module supports C*D MIMO communications to transmit and receive a plurality of second RF signal streams on the second channel, the third communication module supports E*F MIMO communications to transmit and receive a plurality of third RF signal streams on the third channel, wherein A, B, C, D, E and F are positive integers greater than or equal to 1, and the filter module comprises:

an N-port triplexer, coupled to the antennas, receiving the first RF signal streams, the second RF signal streams and the third signal streams and filtering the first RF signal streams according to the first frequency response, filtering the second RF signal streams according to the second frequency response and filtering the third RF signal streams according to the third frequency response, wherein N equals to the maximum value among the A, B, C, D, E and F.

* * * * *